United States Patent
Li

(10) Patent No.: US 11,231,340 B2
(45) Date of Patent: Jan. 25, 2022

(54) ON-LINE SEALING DETECTING DEVICE, MULTI-SECTION-TYPE SEAL CHAMBER PROCESSING EQUIPMENT AND METHOD

(71) Applicant: VIGOR GAS PURIFICATION TECHNOLOGIES, INC., Jiangsu (CN)

(72) Inventor: Chunfeng Li, Jiangsu (CN)

(73) Assignee: VIGOR GAS PURIFICATION TECHNOLOGIES, INC., Jiangsu (CN)

(*) Notice: Subject to any disclaimer, the term of this patent is extended or adjusted under 35 U.S.C. 154(b) by 286 days.

(21) Appl. No.: 16/081,730

(22) PCT Filed: Nov. 29, 2016

(86) PCT No.: PCT/CN2016/107579
§ 371 (c)(1),
(2) Date: Aug. 31, 2018

(87) PCT Pub. No.: WO2017/166837
PCT Pub. Date: Oct. 5, 2017

(65) Prior Publication Data
US 2019/0277723 A1    Sep. 12, 2019

(30) Foreign Application Priority Data
Mar. 29, 2016   (CN) .......................... 201610187386.0

(51) Int. Cl.
*G01M 3/28*       (2006.01)
*B25J 21/02*      (2006.01)
(Continued)

(52) U.S. Cl.
CPC ............ *G01M 3/2853* (2013.01); *B25J 21/02* (2013.01); *G01M 3/26* (2013.01); *G01M 3/32* (2013.01)

(58) Field of Classification Search
CPC ............ G01M 3/30; G01M 3/26; G01M 3/32; G01M 3/3272; G01M 3/2861;
(Continued)

(56) References Cited

U.S. PATENT DOCUMENTS 3,825,041 A * 7/1974 Cornog .................. F16L 23/04
141/1
4,926,680 A * 5/1990 Hasha .................... G01M 3/223
73/46

(Continued)

FOREIGN PATENT DOCUMENTS

CN       101191754 A     6/2008
CN       103115735 A     5/2013
(Continued)

*Primary Examiner* — Nimeshkumar D Patel
*Assistant Examiner* — Gedeon M Kidanu
(74) *Attorney, Agent, or Firm* — Muncy, Geissler, Olds & Lowe, P.C.

(57) ABSTRACT

An on-line sealing detecting device, which is set on a butting surface of two parts, and includes: a seal ring installed in the butting surface of two parts, and a circumferential chamber set in this seal ring ; an inlet and outlet unit connected with the inner of the chamber, and one detection unit set on this inlet and outlet unit. This detection unit is connected with a processor through electric connection and is used for detecting the gas pressure value and/or gas concentration value in the inlet and outlet unit, and for sending the gas pressure value and/or gas concentration value to the processor. An on-line sealing detecting method realizing an on-line detection of part sealing, and detecting each operation position of multi-section-type seal chamber processing equipment at the same time effectively improves the sealing detection efficiency of multi-section-type seal chamber processing equipment.

8 Claims, 2 Drawing Sheets

(51) Int. Cl.
*G01M 3/26* (2006.01)
*G01M 3/32* (2006.01)

(58) Field of Classification Search
CPC .. G01M 3/3209; G01M 3/2853; G01M 3/002;
G01M 3/223; G01M 3/2823; G01M
3/2815; G01M 3/3218; G01M 3/2869;
G01M 3/3236; G01M 3/022; G01M
3/205; G01M 3/226; G01M 3/28; G01M
3/283; G01M 3/2876; G01M 3/3281;
B25J 21/02; G01L 7/16; G01L 7/166;
F04B 39/0005; F04B 53/143; F04D
29/124; F16J 15/3484; F16J 15/3492;
F16L 2201/30; F16L 23/003; F16L
23/167; F16L 23/04; F16L 39/005; F16L
55/44; F16L 55/16455; F16L 55/18;
F17D 3/00; F17D 5/04
USPC .............................. 73/40, 40.5 R, 46, 49.1
See application file for complete search history.

(56) References Cited

U.S. PATENT DOCUMENTS

| | | | | |
|---|---|---|---|---|
| 5,209,105 | A * | 5/1993 | Hasha | G01M 3/223 |
| | | | | 73/46 |
| 5,495,748 | A | 3/1996 | Brede | |
| 6,348,869 | B1 * | 2/2002 | Ashworth | G01M 3/2853 |
| | | | | 340/605 |
| 6,810,715 | B2 * | 11/2004 | Castro | G01M 3/3218 |
| | | | | 73/37 |
| 7,174,772 | B2 * | 2/2007 | Sacca | G01M 3/3218 |
| | | | | 73/49.2 |
| 8,739,607 | B2 * | 6/2014 | Slack | G01M 3/2869 |
| | | | | 73/49.1 |
| 9,880,065 | B1 * | 1/2018 | Miguez | F04B 53/16 |
| 10,401,255 | B1 * | 9/2019 | Chamberlain | G01M 3/205 |
| 2002/0129640 | A1 * | 9/2002 | Summers | F16K 37/005 |
| | | | | 73/46 |
| 2004/0149014 | A1 * | 8/2004 | Castro | G01M 3/3218 |
| | | | | 73/37 |
| 2008/0307858 | A1 * | 12/2008 | McManus | G01M 3/226 |
| | | | | 73/40.7 |
| 2009/0127848 | A1 * | 5/2009 | Carns | F16L 39/005 |
| | | | | 285/55 |
| 2009/0290971 | A1 * | 11/2009 | Shamseldin | F16J 15/3492 |
| | | | | 415/1 |
| 2011/0185793 | A1 * | 8/2011 | Harrison | G01M 3/28 |
| | | | | 73/46 |
| 2013/0327412 | A1 * | 12/2013 | DeGeorge | G01M 3/022 |
| | | | | 137/15.01 |
| 2017/0363502 | A1 * | 12/2017 | Langhelle | G01M 3/2861 |

FOREIGN PATENT DOCUMENTS

| | | | |
|---|---|---|---|
| CN | 203414244 | U | 1/2014 |
| CN | 103712754 | A * | 4/2014 |
| CN | 103712754 | A | 4/2014 |
| CN | 104122048 | A * | 10/2014 |
| CN | 104122048 | A | 10/2014 |
| CN | 105738047 | A | 7/2016 |

* cited by examiner

ON-LINE SEALING DETECTING DEVICE, MULTI-SECTION-TYPE SEAL CHAMBER PROCESSING EQUIPMENT AND METHOD

TECHNICAL FIELD

This invention not only involves a sealing detecting technology, but also involves an on-line sealing detecting device, multi-section-type seal chamber processing equipment and method.

BACKGROUND TECHNOLOGY

In the scientific research and industrial production, the processing equipment, such as vacuum equipment, high-voltage equipment, biological separation equipment and inert atmosphere environmental equipment, etc., which owns vacuum environment in the inner is usually needed. The above equipment can create various work environments for the scientific research and industrial production to meet the different and harsh process demands. But the above equipment only creates an independent environment space which is different from the outside world, so it needs to be sealed for separating from the outside world. It is very different to realize the excellent scientific research and production environment and cannot meet the harsh requirements, if the equipment is not sealed. After the sealing of the equipment, the sealing inspection shall be conducted in the subsequent production process, and monitor the sealing conditions in the using process or diagnose the non-sealing conditions after the users use it.

Currently, the sealing detection usually adopts the helium mass spectrum detector, which needs the special detecting instrument and helium, etc. So it cannot realize a real-time and on-line monitoring; Especially for the large-scale multi-section-type interconnecting device, the detection work of each sealing surface has to be conducted manually, and the workload is very large, but also greatly influences the detection efficiency.

INVENTION CONTENTS

To solve the above technical problems, this invention provides an on-line sealing detecting device, multi-section-type seal chamber processing equipment and method which can realize an on-line monitoring and are suitable for multi-section-type seal chamber processing equipment.

To achieve the above purpose, the technical proposal of this invention is as follows:

An on-line sealing detecting device, which is set on a butting surface of two parts and includes:

a seal ring, which is installed in the butting surface of two parts, and a circumferential chamber, which is set in this seal ring at least;

an inlet and outlet unit, which is connected with the inner of the chamber, and one detection unit, which is set on this inlet and outlet unit at least, wherein the detection unit is connected with a processor through electric connection and is used for detecting the gas pressure value and/or gas concentration value in the inlet and outlet unit, and for sending then the gas pressure value and/or gas concentration value to the processor.

The on-line sealing detecting device of this invention is mainly set up with the seal ring and inlet and outlet unit, etc. After the circumferential seal ring of the chamber seals a butting surface of two parts, the inlet and outlet unit is connected with the inner of the chamber, and this chamber can be negative or positive pressure, as well as filled with a special gas. Then the gas pressure value and/or gas concentration value is detected in the inlet and outlet unit through the detection unit, and the processor makes the analysis and judgment. Thus, we can quickly know whether the chamber has the air leakage phenomenon, and further know whether the cavity is in the vacuum state.

Therefore, compared with the existing technology, this invention can realize an on-line detection of chamber sealing, and detect each operation position of multi-section-type seal chamber processing equipment at the same time, which can effectively improve the sealing detection efficiency of multi-section-type seal chamber processing equipment, and is more suitable for the detection requirements of multi-section-type seal chamber processing equipment. Thus, the invention can realize to improve and facilitate to detect and monitor the production and using process of vacuum equipment, high-voltage equipment, biological separation equipment and inert atmosphere environmental equipment online, especially the detection and monitoring of large-scale interconnecting device.

On the basis of the above technical proposal, this invention can also make the following improvements:

According to a preferred proposal, the above inlet and outlet unit sets up an inlet control unit and/or outlet control unit, which is connected with the processor through electric connection, and wherein the processor, after receiving the gas pressure value and/or gas concentration value, compares it with a preset value in the processor. Then the processor will control the inlet control unit and outlet control unit through the inlet and outlet unit to increase gas and/or reduce gas in the chamber according to the comparison results.

Adopting the above preferred proposal can realize the timely and automatic adjustment of the vacuum degree in the cavity.

According to a preferred proposal, the inlet and outlet unit is a pipeline.

Adopting the above preferred proposal can be convenient for the gas transit and the sealing detection.

According to a preferred proposal, the above inlet control unit and outlet control unit are a magnetic valve or pneumatic valve.

Adopting the above preferred proposal can be convenient for the automatic control of inlet and outlet.

According to a preferred proposal, the above detection unit includes a pressure sensor and/or concentration sensor.

Adopting the above preferred proposal can realize the detection for the pressure and concentration.

According to a preferred proposal, the above processor is also connected with an alarm unit through the electric connection, and wherein the processor, after receiving the gas pressure value and/or gas concentration value, can control the alarm unit to alarm to the outside world according to the setting.

Adopting the above preferred proposal can remind the outside world to know the change of the vacuum inside the equipment.

A multi-section-type seal chamber processing equipment, which includes two butting vacuum units at least, and wherein a cavity is set in this vacuum unit. The above on-line sealing detecting device is set on a butting surface of parts of the two vacuum units at least.

The multi-section-type seal chamber processing equipment of this invention adopts the above on-line sealing detecting device, therefore, it has the same technical effect.

According to a preferred proposal, the above vacuum unit is a glove box.

Adopting the above preferred proposal can directly apply the on-line sealing detecting device in the glove box.

An on-line sealing detecting method, which includes the following steps:

1) Install a seal ring in a butting surface of two parts, and set up a circumferential chamber in the seal ring at least;

2) Set an inlet and outlet unit used for connecting with the chamber, and set one detection unit on this inlet and outlet unit at least. This detection unit is connected with a processor through electric connection and is used for detecting the gas pressure value and/or gas concentration value in the inlet and outlet unit, and then sends the gas pressure value and/or gas concentration value to the processor.

The on-line sealing detecting method of this invention adopts the above on-line sealing detecting device; therefore, it has the same technical effect.

According to a preferred proposal, the inlet and outlet unit sets up an inlet control unit and/or outlet control unit, which is connected with the processor through electric connection, and wherein the processor, after receiving the gas pressure value and/or gas concentration value, compares it with a preset value in the processor. Then the processor will control the inlet control unit and outlet control unit through the inlet and outlet unit to increase gas and/or reduce gas in the chamber according to the comparison results.

Adopting the above preferred proposal can realize the timely and automatic adjustment of the vacuum degree in the cavity.

LIST OF REFERENCE SIGNS

Figure 1:
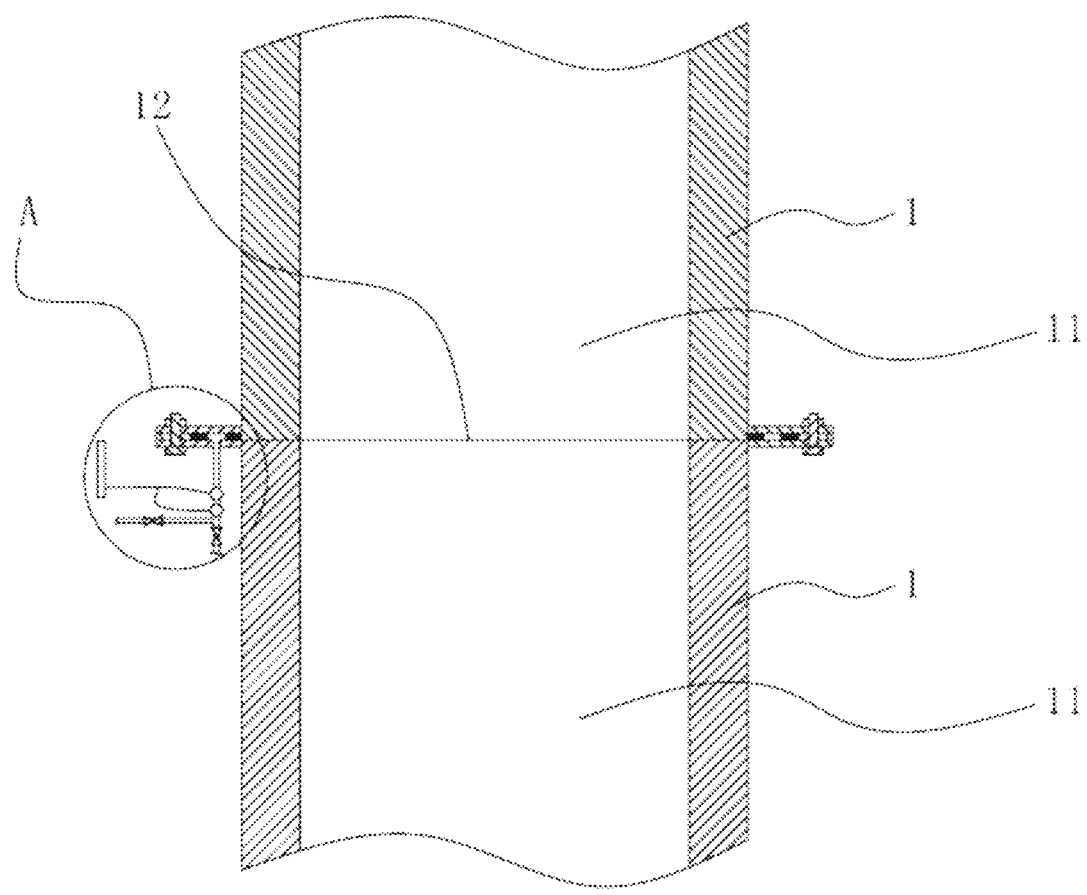
FIG. 1 is a structure diagram of an on-line sealing detecting device and a multi-section-type seal chamber processing equipment according to this invention.

1. Vacuum unit
11. Cavity
12. Butting surface
2. Seal ring
21. Chamber
3. Inlet and outlet unit
31. Inlet control unit
32. Outlet control unit
4. Detection unit
41. Pressure sensor
42. Concentration sensor
5. Processor
6. Alarm unit.

DETAILED DESCRIPTION OF THE INVENTION

A preferred implementation mode of this invention will be described with the following attached figures.

Figure 2:
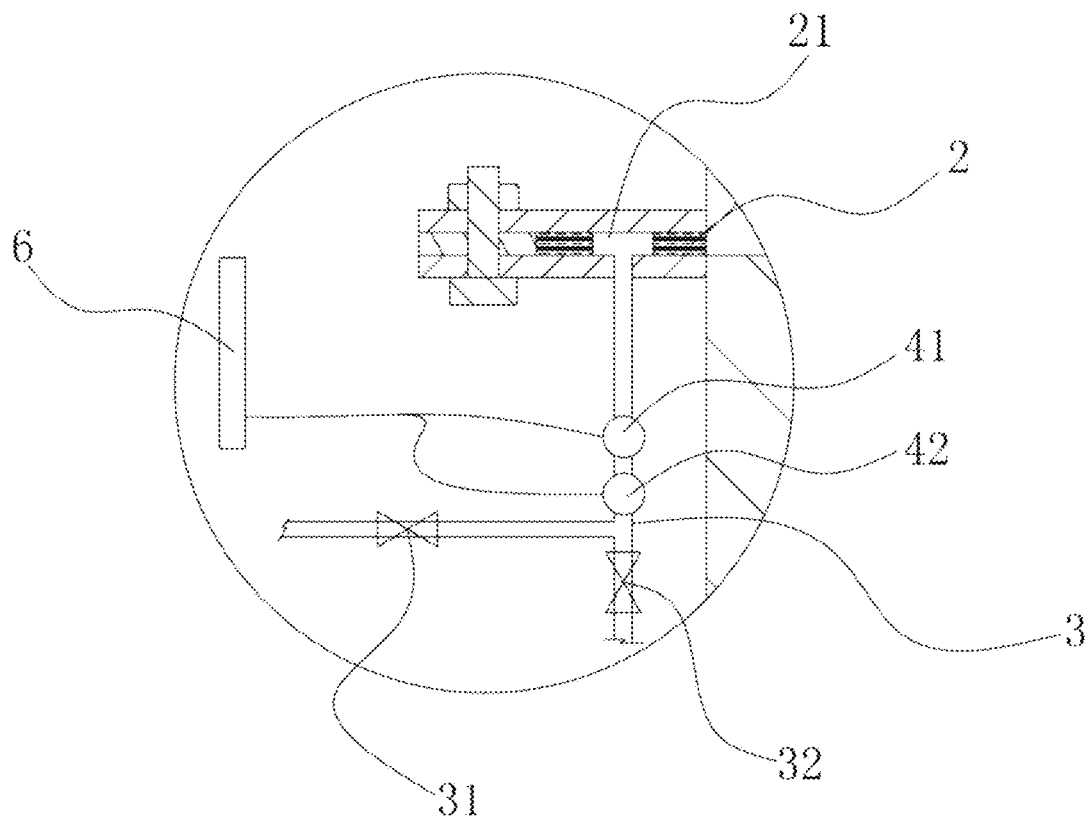
FIG. 2 is an enlarged drawing of A part in FIG. 1.
Figure 3:
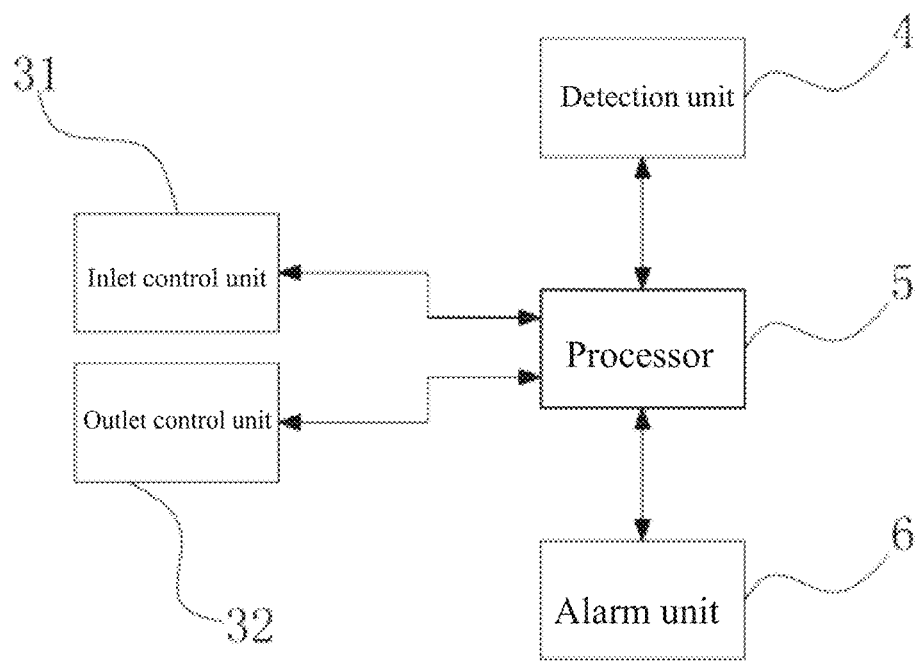
FIG. 3 is a system frame diagram of an on-line sealing detecting device according to this invention.

To achieve the purpose of this invention, as shown in FIG. 1-3, in some implementation modes of the on-line sealing detecting device according to this invention, set a butting surface 12 of two cavities 11, and this cavity 11 shall be in the vacuum unit 1. The on-line sealing detecting device includes: a seal ring 2, which is installed in the butting surface 12 (it can be the flange plate used for connecting) of two cavities 11, and a circumferential chamber 21 (it can be one or multiple according to the needs), which is set in this seal ring 2; an inlet and outlet unit 3, which is connected with the inner of the chamber 21, and this inlet and outlet unit 3 can be a pipeline or a cavity, etc. Such inlet and outlet unit 3 sets up a detection unit 4, which is connected with the processor 5 through the electric connection. In an implementation mode, the detection unit 4 adopts the pressure sensor 41 for detecting the gas pressure value in the inlet and outlet unit; In another implementation mode, the detection unit 4 adopts the concentration sensor 42 for detecting the gas concentration value in the inlet and outlet unit; In another implementation mode, the detection unit 4 adopts pressure sensor 41 and concentration sensor 42 for detecting the gas concentration value and gas pressure value in the inlet and outlet unit. Then the detection unit 4 will sent the gas pressure value and/or gas concentration value to the processor 5. This unit can not only be applied to the butting surface of the two cavities, but also the butting surface of any two annuluses, bull rings, square rings and irregular rings or the butting surface between the cavity and the annuluses, bull rings, square rings and irregular rings, such as the butting position between the ring of glove mouth and antechamber.

As shown in FIG. 1-3, in some implementation modes of the on-line sealing detecting method according to this invention, it includes the following steps: S1: Install the seal ring 2 in the butting surface 12 of the two cavities 11, and set the circumferential chamber 21 in the seal ring 2; S2: Set the inlet and outlet unit 3 which is connected with the chamber 21, and set the detection unit 4 on the inlet and outlet unit 3. Connect the detection unit 4 with the processor 5 through the electric connection, and the detection unit 4 will detect the gas pressure value and/or gas concentration value in the inlet and outlet unit 3, then it will send the gas pressure value and/or gas concentration value to the processor 5. The implementation can also include a Step S3: Set inlet control unit 31 and outlet control unit 32 on the inlet and outlet unit 3, which is connected with the processor 5 through the electric connection respectively. This inlet control unit 31 and outlet control unit 32 can be a magnetic valve or pneumatic valve, and the processor 5, after receiving the gas pressure value and/or gas concentration value, compares it with the preset value in the processor 5. Then the processor 5 will control the inlet control unit 31 and outlet control unit 32 through the inlet and outlet unit 3 to increase gas and/or reduce gas in the chamber 21 according to the comparison results. In some other implementation modes, the above inlet and outlet unit sets up an inlet control unit 31 and outlet control unit 32, which is connected with the processor 5 through the electric connection respectively. The processor 5. after receiving the gas pressure value and/or gas concentration value, compares it with the preset value in the processor 5. Then the processor 5 will control the inlet control unit 31 and outlet control unit 32 through the inlet and outlet unit 3 to increase gas and/or reduce gas in the chamber 21 according to the comparison results. Adopting the proposal of implementation mode can realize the timely and automatic adjustment of the vacuum degree in the cavity.

The on-line sealing detecting device of this embodiment mainly set up the seal ring and inlet and outlet unit, etc. After the circumferential seal ring of the chamber seals the butting surface of two cavities, the inlet and outlet unit is connected with the inner of the chamber, and this chamber can be negative or positive pressure, as well as filled with a special gas. Then the gas pressure value and/or gas concentration value is detected in the inlet and outlet unit through the detection unit, and the processor makes the analysis and judgment. Thus, we can quickly know whether the chamber has the air leakage phenomenon, and further know whether the cavity is in the vacuum state. Therefore, compared with the existing technology, this embodiment can realize an on-line detection of chamber sealing, and detect each operation position of multi-section-type seal chamber processing equipment at the same time, which can effectively improve the sealing detection efficiency of multi-section-type seal chamber processing equipment, and is more suitable for the detection requirements of multi-section-type seal chamber processing equipment. Thus, the invention can improve and facilitate to detect and monitor the production and using process of vacuum equipment, high-voltage equipment, biological separation equipment and inert atmosphere environmental equipment online, especially the detection and monitoring of large-scale interconnecting device.

To further improve the implementation effect of this invention, as shown in FIG. 1-3, in some other implementation modes of the on-line sealing detecting device according to this invention and on the basis of the above contents, the above inlet and outlet unit sets up an inlet control unit 31 and outlet control unit 32, which is connected with the processor 5 through the electric connection respectively. This inlet control unit 31 and outlet control unit 32 can be a magnetic valve, and the processor 5, after receiving the gas pressure value and/or gas concentration value, compares it with the preset value in the processor 5. Then the processor 5 will control the inlet control unit 31 and outlet control unit 32 through the inlet and outlet unit 3 to increase gas and/or reduce gas in the chamber 21 according to the comparison results. In some other implementation modes, the above inlet and outlet unit sets up an inlet control unit 31 and outlet control unit 32, which is connected with the processor 5 through the electric connection respectively. The processor 5, after receiving the gas pressure value and/or gas concentration value, compares it with the preset value in the processor 5. Then the processor 5 will control the inlet control unit 31 and outlet control unit 32 through the inlet and outlet unit 3 to increase gas and/or reduce gas in the chamber 21 according to the comparison results. Adopting the proposal of implementation mode can realize the timely and automatic adjustment of the vacuum degree in the cavity.

To further improve the implementation effect of this invention, as shown in FIG. 1-3, in some other implementation modes of the on-line sealing detecting device according to this invention and on the basis of the above contents, the above processor 5 is also connected with an alarm unit 6 through an electric connection, and the processor 5, after receiving the gas pressure value and/or gas concentration value, will control the alarm unit 6 to alarm to the outside world according to the setting, and this alarm unit 6 can be an audible and visual alarm. Adopting the proposal of implementation mode can remind the outside world to know the change of the vacuum inside the equipment.

To achieve the purpose of this invention, as shown in FIG. 1-3, in some implementation modes of the multi-section-type seal chamber processing equipment according to this invention, it includes two butting vacuum units 1 (it can be set multiple according to the needs). A cavity 11 is set in this vacuum unit 1 and the above on-line sealing detecting device is set on the butting surface 12 of this cavity 11. The multi-section-type seal chamber processing equipment of this embodiment adopts the above on-line sealing detecting device; therefore, it has the same technical effect.

To further improve the implementation effect of this invention, as shown in FIG. 1-3, in some other implementation modes of the on-line sealing detecting device according to this invention and on the basis of the above contents, the above vacuum unit is a glove box. Adopting the proposal of implementation mode can directly apply the on-line sealing detecting device in the glove box.

To sum up, this invention can automatically detect the on-line sealing of vacuum equipment, high-voltage equipment, biological separation equipment and inert atmosphere environmental equipment, etc. during the production process, which greatly improve the equipment production efficiency; It can also automatically detect the on-line sealing of vacuum equipment, high-voltage equipment, biological separation equipment and inert atmosphere environmental equipment, etc. during the using process; It can also automatically alarm the leakage of vacuum equipment, high-voltage equipment, biological separation equipment and inert atmosphere environmental equipment, etc. during the using process.

The above content is only the preferred implementation mode of this invention. It is pointed out that for the technical personnel of this field, they can make several deformations and improvements on the premise of not separating from this invention idea, which belongs to the protection scope of this invention.

The invention claimed is:

1. An on-line sealing detecting device, which is set on a butting surface of two vacuum cavities, comprising:
   a seal ring installed in the butting surface of the two vacuum cavities, and
   a circumferential chamber, which is set in the seal ring;
   an inlet and outlet unit connected with an inner of the chamber; and
   one detection unit, which is set on the inlet and outlet unit, wherein the detection unit is connected with a processor through electric connection and is used for detecting a gas pressure value and/or a gas concentration value in the inlet and outlet unit, and for sending the gas pressure value and/or the gas concentration value to the processor,
   wherein the inlet and outlet unit comprises an inlet control unit and an outlet control unit, the inlet control unit and the outlet control unit connect are disposed on the inlet and outlet unit, the inlet control unit and the outlet control unit connect with the processor through electric connection, and wherein the processor, after receiving the gas pressure value and/or the gas concentration value, compares it with a preset value in the processor, and wherein the processor controls the inlet control unit and the outlet control unit through the inlet and outlet unit to increase gas or reduce gas in the chamber according to comparison results.

2. The on-line sealing detecting device as claimed in claim 1, wherein the inlet and outlet unit is a pipeline.

3. The on-line sealing detecting device as claimed in claim 1, wherein the inlet control unit and the outlet control unit are a magnetic valve or pneumatic valve.

4. The on-line sealing detecting device as claimed in claim 1, wherein the detection unit includes a pressure sensor and/or concentration sensor.

5. The on-line sealing detecting device as claimed in claim 1, wherein the processor is also connected with an alarm unit through electric connection, and wherein the processor, after receiving the gas pressure value and/or the gas concentration value, can control the alarm unit to alarm to an outside world according to a setting.

6. A multi-section-type seal chamber processing equipment, comprising two butting vacuum units, wherein each vacuum unit comprises a cavity and wherein an on-line sealing detecting device as claimed in one of claims 1, 3, 4 or 5 is set on a butting surface of parts of the two vacuum units.

7. The multi-section-type seal chamber processing equipment as claimed in claim 6, wherein the vacuum unit is a glove box.

8. An on-line sealing detecting method, comprising the following steps:
   1) installing a seal ring in a butting surface of two vacuum cavities, and setting up a circumferential chamber in the seal ring;
   2) setting an inlet and outlet unit connected with the chamber, and setting a detection unit on the inlet and outlet unit, and connecting the detection unit with a processor through an electric connection, and wherein the detection unit detect a gas pressure value and/or a gas concentration value in the inlet and outlet unit, and send the gas pressure value and/or the gas concentration value to the processor, wherein the inlet and outlet unit comprises an inlet control unit and an outlet control unit, the inlet control unit and the outlet control unit connect are disposed on the inlet and outlet unit, the inlet control unit and the outlet control unit connect with the processor through electric connection, and wherein the processor, after receiving the gas pressure value and/or the gas concentration value, compares it with a preset value in the processor, and wherein the processor controls the inlet control unit and the outlet control unit through the inlet and outlet unit to increase gas and/or reduce gas in the chamber according to comparison results.

* * * * *